US012586787B2

(12) United States Patent　　(10) Patent No.:　US 12,586,787 B2

Gim et al.　　(45) Date of Patent:　Mar. 24, 2026

(54) SHELF-LIFE ENHANCED LITHIUM HYDROXIDE VIA THE SURFACE PROTECTION AND THE IMPROVED METAL-DOPED CATHODE MATERIALS USING THE SAME

(71) Applicant: UCHICAGO ARGONNE, LLC, Chicago, IL (US)

(72) Inventors: Jihyeon Gim, Naperville, IL (US); Anil U. Mane, Naperville, IL (US); Jinhyup Han, Naperville, IL (US); Seoung-Bum Son, Naperville, IL (US); Pragathi Darapaneni, Lake Orion, MI (US); Eungje Lee, Naperville, IL (US); Khalil Amine, Oakbrook, IL (US); Jeffrey W. Elam, Elmhurst, IL (US); Jason R. Croy, Plainfield, IL (US); Rajesh Pathak, Westmont, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 535 days.

(21) Appl. No.: 18/106,227

(22) Filed: Feb. 6, 2023

(65) Prior Publication Data

US 2024/0266527 A1　　Aug. 8, 2024

(51) Int. Cl.

| | |
|---|---|
| *H01M 4/525* | (2010.01) |
| *H01M 4/04* | (2006.01) |
| *H01M 4/36* | (2006.01) |
| *H01M 4/485* | (2010.01) |
| *H01M 4/02* | (2006.01) |

(52) U.S. Cl.

CPC ......... *H01M 4/525* (2013.01); *H01M 4/0428* (2013.01); *H01M 4/0471* (2013.01); *H01M 4/366* (2013.01); *H01M 4/485* (2013.01); *H01M 2004/021* (2013.01); *H01M 2004/028* (2013.01)

(58) Field of Classification Search

CPC .. H01M 4/0428; H01M 4/0471; H01M 4/366; H01M 4/485; H01M 4/525

See application file for complete search history.

(56) References Cited

U.S. PATENT DOCUMENTS

| | | | |
|---|---|---|---|
| 8,906,449 | B2 | 12/2014 | Li et al. |
| 2012/0301778 | A1 | 11/2012 | Trevey et al. |
| 2014/0008568 | A1 | 1/2014 | Fujdala et al. |
| 2016/0351973 | A1 | 12/2016 | Albano et al. |
| 2017/0338522 | A1 | 11/2017 | Hu et al. |
| 2019/0103231 | A1 | 4/2019 | Chai et al. |

(Continued)

FOREIGN PATENT DOCUMENTS

| | | | | |
|---|---|---|---|---|
| EP | 3 026 738 A1 | 6/2016 | | |
| KR | 20220036597 A | * 3/2022 | ............ | H01M 4/525 |

(Continued)

OTHER PUBLICATIONS

"Global EV Outlook 2021," International Energy Agency, retrieved from https://www.iea.org/reports/global-ev-outlook-2021 on Nov. 15, 2022, 101 pages (2021).

(Continued)

*Primary Examiner* — Kevin E Yoon

(74) *Attorney, Agent, or Firm* — Foley & Lardner LLP

(57) ABSTRACT

A coated cathode material including high-nickel lithium cathode and a method of producing the same by atomic layer deposition.

11 Claims, 4 Drawing Sheets

(a) LiOH•H₂O (b) LiOH•H₂O - air 2 weeks

(56) References Cited

U.S. PATENT DOCUMENTS

| | | | |
|---|---|---|---|
| 2020/0052326 | A1 | 2/2020 | Hu et al. |
| 2020/0119342 | A1 | 4/2020 | Wantanabe et al. |
| 2021/0234153 | A1 | 7/2021 | Xiao et al. |
| 2021/0336240 | A1 | 10/2021 | Mane et al. |
| 2022/0293921 | A1* | 9/2022 | Lim ...................... H01M 4/625 |

FOREIGN PATENT DOCUMENTS

| | | |
|---|---|---|
| WO | WO-2016/025866 A1 | 2/2016 |
| WO | WO-2020/257176 A1 | 12/2020 |

OTHER PUBLICATIONS

Buechel, et al., "Electrical vehicles (EV) battery supply chain: Country risks and lithium supply," S&P Global Market Intelligence, retrieved from https://www.spglobal.com/marketintelligence/en/mi/research-analysis/electric-vehicles-supply-chain-country-risks-lithium-supply.html on Nov. 15, 2022, 7 pages (2021).

Butler, et al., "Development Status of the Metal Oxide Regenerable CO2 Removal System for the NASA EMU," SAE Technical Paper 972505, 10 pages (1997).

Croy, et al., "Prospects for spinel-stabilized, high-capacity lithium-ion battery cathodes," Journal of Power Sources 334, pp. 213-220 (2016).

Long, et al., "Advances in Stabilizing 'Layered-Layered' xLi2MnO3 x (1-x)LiMO2 (M=Mn, Ni, Co) Electrodes with a Spinel Component," Journal of the Electro Chemical Society 161(14), pp. A2160-A2167 (2014).

Wang, et al., "Synthesis of high capacity cathodes for lithium-ion batteries by morphology-tailored hydroxide co-precipitation," Journal of Power Sources 274, pp. 451-457 (2015).

Bi, et al., "Stability of Li2CO3 in cathode of lithium ion battery and its influence on electrochemical performance," RSC Advances 6(23), p. 19233-19237 (2016).

Chen, et al., "Mechanism for Al2O3 Atomic Layer Deposition on LiMn2O4 from In Situ Measurements and Ab Initio Calculations," Chem 4(10), pp. 2418-2435 (2018).

Darapaneni, et al., "Elucidating the Redox Behavior during Atomic Layer Deposition on Lithium-Ion Battery Cathode Materials," Chemistry of Materials 33(20), pp. 8079-8088 (2021).

Gutierrez, et al., "Multifunctional Films Deposited by Atomic Layer Deposition for Tailored Interfaces of Electrochemical Systems," Journal of the Electrochemical Society 167(14):140541 (2020) (24-page accepted manuscript provided).

Han, et al., "Negating interfacial impedance in garnet-based solid-state Li metal batteries," Nature Materials 16, pp. 572-579 (2017) (advanced online publication provided; 9 pages).

Kang, et al., "Modification of LiMn2O4 surfaces by controlling the Acid-Base surface chemistry of atomic layer deposition," Applied Surface Science 599:153329 (2022) (45-page accepted manuscript provided).

Park, et al., "Ultrathin Lithium-Ion Conducting Coatings for Increased Interfacial Stability in High Voltage Lithium-Ion Batteries," Chemistry of Materials 26(10), pp. 3128-3134 (2014).

Young, et al., "High-Rate Spinel LiMn2O4 (LMO) Following Carbonate Removal and Formation of Li-Rich Interface by ALD Treatment," The Journal of Physical Chemistry C 123(39), 23783-23790 (2019).

* cited by examiner (a)

(b)

SHELF-LIFE ENHANCED LITHIUM HYDROXIDE VIA THE SURFACE PROTECTION AND THE IMPROVED METAL-DOPED CATHODE MATERIALS USING THE SAME

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to a coated cathode material. More specifically, the present disclosure relates to a cathode material including high-nickel lithium cathode and the method of producing the same.

BACKGROUND

Lithium ion ("Li-ion") batteries have become a dominant player in the energy storage market because of many desirable properties including relatively high energy density and relatively low self-discharge. However, capacity fading, voltage decay and low rate capability are observed upon cycling of many lithium ion batteries. These failures are thought to stem from dissolution of metals into liquid electrolytes and structural instability of cathode materials caused by lattice strain induced by lithium ion intercalation upon each discharge. In response, more advanced energy storage options based upon a lithium framework are sought after.

The extremely high-nickel (>~95%) cathode materials have been of interest as an alternative to its layered counterpart, $LiCoO_2$, because of its intrinsically high energy density without the need of expensive cobalt. However, the optimization of synthetic condition for high-nickel cathode is challenging to achieve because of narrow ranges of conditions including gas atmosphere, temperature, the ratio of lithium/metal, and the lithium precursor. The use of lithium hydroxide (anhydrous-/monohydrate-form) is essential for the synthesis of high-nickel cathodes because of its lower melting temperature than that of $Li_2CO_3$. The lower melting temperature allows the lithiation to proceed effectively.

However, high-nickel cathodes have limitations to commercialization due to a structural instability correlating with the severe capacity fading and oxygen loss when cycling at high states of charge. The advanced cathode can be achieved by the modification of atomic structure in the bulk by doping and the surface of particles via coating strategy. Challenges with introducing secondary elements remain the difficulty in use of precursor and synthesis process as well as in realizing uniformity of dopant element and coating compounds. Thus, there remains a need for a method to modify the surface and/or bulk of Li-ion cathodes as well as for a novel cathode and battery to provide improved properties.

In producing high-nickel cathodes, the demand for high-purity (>99%), battery grade $LiOH/LiOH \cdot H_2O$ has increased remarkably. In order to maintain high purity, the shelf-life of lithium hydroxide is considered to be the most important factor for extended storage under controlled atmosphere and even in open-air due to a favorable transition to $Li_2CO_3 \cdot Li_2CO_3$, which has a higher decomposition temperature, delays the calcination reaction hindering facile formation of a good $LiNiO_2$-based cathode at low temperature. To produce $LiNiO_2$-based oxides, high-oxygen partial pressures (i.e. 100% pure oxygen) are often necessary.

Any discussion of problems and solutions involved in the related art has been included in this disclosure solely for the purposes of providing a context for the present invention and should not be taken as an admission that any or all of the discussion was known at the time the invention was made.

SUMMARY

Certain embodiments described herein relate generally to a coated cathode material comprising high-nickel lithium cathode including LiOH and a surface coating, wherein the surface coating is formed by atomic layer deposition of an oxide, fluoride, nitride, or a combination thereof.

Certain embodiments described herein relate to a method of producing a nickel cathode material, the method including: providing a lithium precursor; selectively depositing an oxide, fluoride, nitride, or a combination thereof on the lithium precursor by atomic layer deposition (ALD); preparing a mixture of metal hydroxide with an ALD-treated lithium precursor; and calcining the prepared mixture at a temperature equal to or lower than 700° C. under pure $O_2$ gas atmosphere. Exemplary methods can include selectively depositing the oxide, wherein the oxide is selected from one or more metal oxides, such as $Al_2O_3$, MgO, $SiO_2$, $TiO_2$, ZnO, $SnO_2$, $ZrO_2$, $Nb_2O_5$, and/or $B_2O_3$. After calcining the prepared mixture, a lithium metal oxide (e.g., formed from a deposited metal oxide) is formed. After calcination, the precursor may further be doped with a metal element.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are not, therefore, to be considered limiting of its scope, the disclosure will be described with additional specificity and detail through use of the accompanying drawings.

Figure 1A:
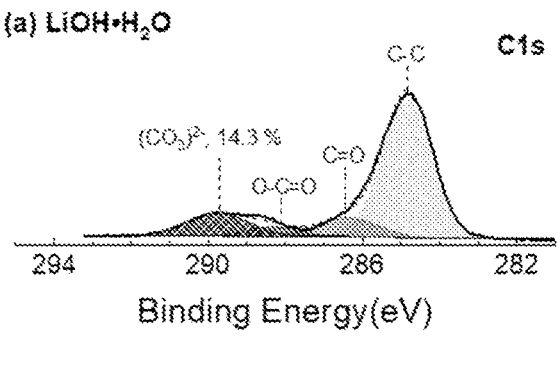
FIGS. 1A-1D show C-1s X-ray photoelectron spectroscopy showing $LiOH \cdot H_2O$ (FIGS. 1A-1B) and ALD-treated $LiOH \cdot H_2O$ (FIGS. 1C-1D) before and after open-air storage for 2 weeks.
Figure 1B:
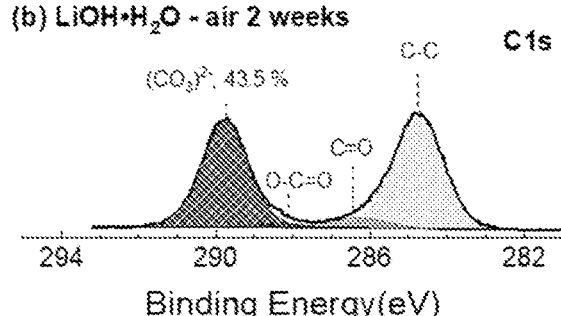
Figure 1C:
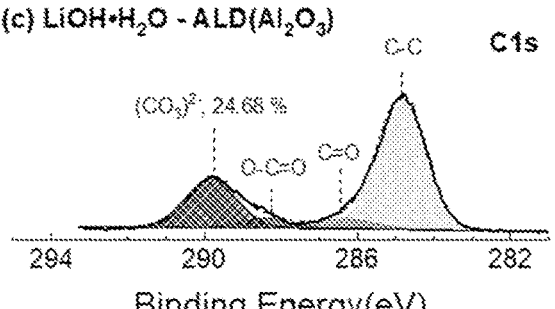
Figure 1D:
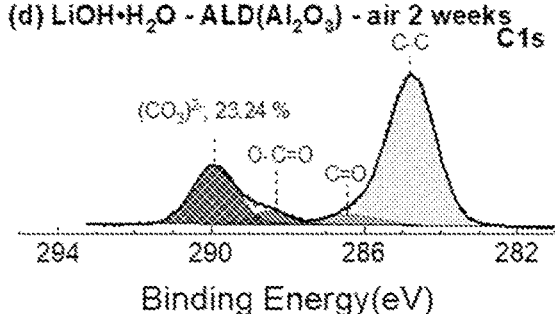

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

As used herein "room temperature" shall mean temperatures within 15 to 40° C.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

Some embodiments relate to cathode materials, such as lithium, and methods of producing such cathode materials. Such materials exhibit novel elemental distribution uniformity through an ALD method that provides uniform elemental distribution both on the surface and a uniform dopant distribution within the bulk of the material.

In one embodiment, a traditional ALD coating system is utilized. ALD is a gas phase deposition method that is generally performed using repeated cycles of alternating exposures of the precursor surface to one or more chemical vapors (ALD precursors) that are generally followed by purges of unreacted ALD precursor and any ALD byproducts. Typically, each ALD precursor reacts with surface reactive functional groups resulting in a half-reaction of the overall chemistry. ALD precursors typically do not self-react, but rather only react with the functionalized surface produced by reaction with, e.g., the complementary precursor. Consequently, the deposition produced by each half-reaction can proceed until no remaining active sites on the precursor surface are accessible to the ALD precursor, making the deposition self-limiting. ALD can be carried out under various operating temperatures, pressures, ALD precursor dose times and purge times, and reactor configurations.

ALD, and variants thereof, allows modifications such as controlled substitution of secondary elements into lithium ion electrode materials. The methods allow for precise and repeatable control over doping level as well as the ability to introduce secondary elements that are typically hard to realize (e.g., Al-doping of Ni-rich structures). In addition, the methods can be used to enhance the stability of surfaces against the effects of unwanted surface reactions that lead to secondary phases (e.g., lithium-carbonates/hydroxides) that are commonly found on certain lithium-ion cathodes, especially when exposed to air, thereby improving shelf-life. Similarly, oxide bulk and surface properties can be modified through selection of materials, at the oxide and ALD precursor stage, that have tendencies to, for example, migrate towards surfaces during secondary annealing.

In one embodiment, the method of producing a cathode material comprises: providing a precursor, selectively depositing an oxide, fluoride, nitride, or a combination thereof on a precursor by atomic layer deposition (ALD), preparing a mixture of hydroxide with an ALD-treated precursor, and calcining the prepared mixture.

The method described herein provides several advantages. For instance, ALD uses chemical vapors and self-limiting surface chemistry that produce extremely uniform and conformal coatings even on powders. The wide range of available ALD precursors allows one to select compounds with the ideal combination of vapor pressure, reactivity, and degree of self-limiting growth behavior. Moreover, ALD is performed at relatively low temperatures (e.g., 100-200° C.). This offers controlling both coating and doping of the desired material on bare non-lithiated cathode materials. For example, once a bare cathode powder is coated by ALD to produce a uniform distribution of the ALD precursor elements over the cathode surface, subsequent heat treatments can drive the elements into the bulk of the cathode as dopants. The uniform surface coating inhibits the formation of $Li_2CO_3$ in open air environment, thereby enhancing shelf-life. Furthermore, homogeneous doping can be achieved without an additional metal source.

Processes described herein may be carried out in a reaction chamber, which may include a suitable particle handling system such as a fluidized bed, rotating drum, sequential batch mixer, or vibrating reactor. These systems can provide a desired environment for the particles to interact with the gases and be coated while not aggregating the particles together.

During the atomic layer deposition, one or more of an oxide, a fluoride, and a nitride are selectively deposited on a precursor material. During this step, the material can be exposed to one or more and less than or equal to hundred atomic layer deposition cycles. In some preferred embodiments, the material can be exposed to one or more and less than or equal to ten, or to one or more and less than or equal to four, or to one or more and less than or equal to six of atomic layer deposition cycles. The number of atomic layer deposition cycles may be determined based on the desired thickness of the coating, the desired doping level of the cathode material, the ALD precursors used, the growth per cycle value of the ALD precursors used, and the ALD nucleation rate on the precursor surface. The amount of ALD precursor supplied during the dose time of each ALD cycle will be determined by the amount of precursor to be coated, the specific surface area of the precursor, the temperature used to form the coating, the duration off the ALD precursor dose, the vapor pressure of the ALD precursor, and the mass flow rate of the carrier gas used.

When using ALD to coat materials used in electrochemical cells and batteries (e.g., for use in cathode active material), choice of coating material can be important, because preferred coatings may desirably maintain the bulk capacity of the electrode, be conductive to Li ions and electrons, and be chemically resistant to degradation in the electrolyte environment. In some cases, coating thickness can be sub-2 nm or deposited with fewer than 10 ALD cycles. In some embodiments, the number of ALD cycles may be less than or equal to 6 cycles. For example, the ALD coating of $Al_2O_3$ on lithium hydroxide precursor using less than or equal to 6 ALD cycles allows enough Li—Al-oxide to be available for Li diffusion and to protect the transition metals in the cathode material, whereas too many ALD cycles may produce a thick Li—Al-oxide coating that inhibits lithium diffusion. After initially reacting to form non-stoichiometric lithium metal oxide, the lithium metal oxide may form stoichiometrically over, for example, LiOH to form, for example, stoichiometric amorphous lithium metal oxide (e.g., $LiAlO_2$). Lithium can diffuse through the amorphous lithium metal oxide (e.g., $LiAlO_2$) oxide and can be present on the surface, thereby enhancing cathode performance. In some embodiments, 6 ALD cycles may be desirable to achieve 2-4 mol % of Al dopant, which would exhibit an improved cathode performance.

Due to the ultrathin nature of ALD films, the coatings are more flexible that the corresponding bulk material and withstand larger strains, and thus are less likely to mechanically fail from the repeated cycle of lattice expansions and contractions caused by lithium intercalation and deintercalation. Oxide, nitride, and fluoride coatings, such as alumina ALD films, have shown improved surface structural stability and chemical durability.

The oxide deposited using ALD can be selected from one or more of the group consisting of $Al_2O_3$, MgO, $SiO_2$, $TiO_2$, ZnO, $SnO_2$, $ZrO_2$, $Nb_2O_5$, and/or $B_2O_3$. A person skilled in the art would easily understand that metal oxides of any kinds including elements such as La, Ga, Y, Mo, Ce, Ca, etc.

may also be used. The nitride can be selected from one or more of the group of metal nitrides and metalloid nitrides. The fluoride can be selected from one or more of the group of metal fluorides Examples of possible coating materials include but are not limited to: $Al_2O_3$, MgO, $TiO_2$, $ZrO_2$, $HfO_2$, $Ga_2O_3$, GaN, MoN, WN, WZnO, $In_2O_3$, $SnO_2$, $MnO_2$, $MoS_2$, $WS_2$, $GaS_2$, $MgS_2$, $HfS_2$, BAIO, $Gd_2O_3$, LizO, LIOH, $LiCO_3$, LizS, LIF, $B_2O_3$, $Al_xB_{(1-x)}O_y$, $MgF_2$, $Al_2S_3$, $AlPO_4$, $SiO_2$, $P_2O_3$, $CaF_2$, TIN, N:$TiO_2$, $V_2O_5$, Fe, $Fe_2O_3$, $Fe_2S_3$, Co, $Co_3O_4$, NiO, Cu, CuO, CuzS, CuS, ZnO, ZnS, $GazS_3$, SrO, $Y_2O_3$, ZrN, $Nb_2O_5$, $NbC_xN_y$, $NbSi_x$, Mo, $MoO_3$, $MoAlC_xF_y$, Ru, $RuO_2$, Pd, PdO, CdO, CdS, $In_2S_3$, SnS, Sb, $Sb_2O_3$, $Sb_2S_3$, BaO, $HfBO_x$, TaN, $TaC_xN_y$, W, $WO_3$, $WAlC_xF_y$, $ReAl_2O_3CH_3$, Ir, $IrO_2$, Pt, PtO, $Bi_2O_3$, $CeO_2$, $Sm_2O_3$, $Sm_2S_3$, $Tb_2O_3$, Al:ZnO, B:ZnO, F:$SnO_2$, Zn:$SnO_2$, ITO, $LiAlS_x$, $LiGaS_x$, $LiAlO_x$, $LiGaO_x$, $CuZnSnS_x$, YSZ, YBCO, Pt—Ir, Pt—Pd, Pt—Ru, Pd—Ru, W—Mo, alucone, lithicone, and zincone.

In some embodiments, the ALD coating is produced by exposing the precursor to a single ALD precursor such as TMA, $AlCl_3$, TMB, $TiCl_4$, $H_2S$, $WF_6$, $MoF_6$, TMG, TMIn, $BF_3$, $B_2F_4$, or DEZ.

In some embodiments, the coatings may be alumina. The electrically insulating nature of alumina results in a reduction of the electronic conductivity as the film thickness increases. ALD can produce ultrathin uniform films that stabilize the metal oxide structure by inhibiting contact with the electrolyte. Further, the ultrathin nature of ALD facilitates diffusion of lithium through the protective films and, because of this, does not result in a significant capacity loss.

As illustrated in more detail below, during the ALD steps, the ALD precursor may react with a precursor material (e.g., lithium hydroxide) forming a lithium metal oxide (e.g., $LiAlO_2$), nitride, boride, or fluoride preferentially on the precursor material. For example, the precursor material (e.g. lithium hydroxide) may react non-stoichiometrically with substantial reaction product (e.g., $LiAlO_2$), while the metals (e.g., Ni, Co, Mn) are coated by the ALD film to protect the metals from dissolution.

In accordance with examples of the disclosure, ALD precursors and co-reactants used during the atomic layer deposition step can include one or more of trimethylaluminum (TMA) and water, boron trichloride and ammonia, lithium tert-butoxide (LiOtBut) and hexafluoroacetylacetone (Hfac) or titanium tetrafluoride($TiF_4$). A pressure within a reaction chamber during the ALD step can range from about 0.01 Torr to about 1 Torr, or about 1 Torr to about 10 torr or about 25 Torr to about 760 Torr. A temperature within a reaction chamber during the ALD step can range from about 33° C. to about 77° C. or about 150° C. to about 300° C. In one embodiment, for example, TMA may be used as an ALD precursor to form alumina coating.

In some embodiments, the material can also be heated to a predetermined temperature during the ALD process. For example, the first predetermined temperature can be in the range of 50-200° C. (e.g., 50, 60, 70, 80, 90, 100, 110, 120, 130, 140, 150, 160, 170, 180, 190 or 200° C., inclusive of all ranges and values therebetween). In some embodiments, the predetermined temperature is in the range of 70-90° C. (e.g., 85° C.). In some embodiments, the first predetermined temperature can be in the range of 120-140° ° C. (e.g., 135° C.). In some embodiments, the predetermined temperature may be in the range of 145-165° C. (e.g., 150° C.). Temperature impacts the overall energy in the system and the performance for diffusion and/or reaction.

In some embodiments, ALD process comprises a cycle, which may be repeated to form a supercycle, with a first ALD metal precursor vapor pulse, such as TMA for modification with aluminum (e.g., for 5 seconds), followed by a first ALD metal precursor exposure (e.g., for 30 seconds) in a sealed vacuum chamber, followed by a ALD metal precursor purge (e.g., for 10 seconds) where the reactor is pumped to a vacuum, followed by a co-reactant pulse, such as water (e.g., for 1 second) with a co-reactant exposure (e.g., for 1 second), followed by a co-reactant purge (e.g., for 10 seconds). It should be appreciated that more complicated ALD schemes may be constructed as a supercycle comprising various subcycles for depositing a material as described or for depositing multiple different materials for multiple dopants or formation of bi (tri, etc.) metallic materials, such as varying the parameters for any of the individual steps within a cycle.

The described ALD process involves the reaction of the first ALD metal precursor and the co-reactant precursor on the lithium precursor surface to result in the deposition of the respective metal oxide, e.g., $Al_2O_3$. As a result, the stoichiometric variations in the resultant lithium precursor can be controlled by the parameters of the ALD, including the number of cycles. Further, stoichiometric variations can be achieved by the use of different precursors.

In some embodiments, the first ALD metal precursor vapor pulse comprises input to the reactor of the first ALD metal precursor vapor for a first ALD metal precursor vapor pulse time of 1 seconds to 100 seconds based on the surface area of the core battery material and the vapor pressure of the first ALD metal precursor (e.g., 0.5, 1, 5, 10, 20, or 30 seconds, inclusive of all ranges and values therebetween), such as 5 seconds. The first partial pressure of the first ALD metal precursor vapor pulse can be in the range of 0.01 Torr to 10,000 Torr (e.g., 10, 25, 50, 75, 100, 500, or 1000 Torr, inclusive of all ranges and values therebetween), such as, in one embodiment, at least 0.5 to 100 Torr. One of skill in the art will appreciate that the duration, pressure, and amount of ALD precursor for the pulse are all factors in determining the overall amount for each of those operation parameters.

In some embodiments, a base material is exposed to the first ALD metal precursor for a first ALD metal exposure time and a first partial pressure of the first ALD metal precursor so that the first ALD metal precursor infiltrates at least a portion of the base material (e.g., infiltrates beneath the surface in the case of a bed of powder) and binds with the base material. In some embodiments, the base material being coated by ALD is LiOH. The first ALD metal exposure time can be in the range of 0.5 seconds to 500 seconds (e.g., 0.5, 1, 5, 10, 20, 30, 40, 50, 60, 70, 80, 90, 100, 120, 140, 160, 180, 200, 220, 240, 260, 280, 300, 350, 400, 450 or 500 seconds, inclusive of all ranges and values therebetween). In some embodiments, the first predetermined time is in the range of 1 and 10 seconds (e.g., about 5 seconds). The first partial pressure of the first ALD metal precursor can be in the range of 0.01 Torr to 10 Torr (e.g., 0.01, 0.05, 0.1, 0.5, 1.0, 5.0, or 10 Torr, inclusive of all ranges and values therebetween). In some embodiments, the first partial pressure of the first ALD metal precursor is in the range of 0.1 Torr and 1 Torr (e.g., about 0.5 Torr).

The first ALD metal precursor purge evacuates unreacted precursor from the reactor. The first ALD metal precursor purge may be for a first ALD metal precursor purge time of 0.5 seconds to 30 seconds (e.g., 0.5, 1, 5, 10, 20, or 30 seconds, inclusive of all ranges and values therebetween), such as 5 seconds. The first ALD metal precursor purge reduces the pressure in the reactor to within the range of 0.01 Torr to 10 Torr (e.g., 0.01, 0.05, 0.1, 0.5, 1.0, 5.0, or 10 Torr, inclusive of all ranges and values therebetween), such as substantially to vacuum. The first ALD metal precursor purge may also consist of flowing an inert gas such as $N_2$ or Ar through the ALD reactor to sweep away unreacted ALD metal precursor and reaction byproducts. In this case, the pressure in the ALD reactor may remain essentially constant during the first ALD metal precursor purge.

The base material, after reaction with the first ALD metal precursor, is then exposed to a second ALD precursor—the co-reactant—by a co-reactant pulse introducing the co-reactant to the reactor and then exposing for the co-reactant exposure such that the second co-reactant precursor reacts with the first ALD metal precursor chemically adsorbed on the base material.

In some embodiments, the second co-reactant vapor pulse comprises input to the reactor of the second co-reactant vapor for a co-reactant pulse time of 0.5 seconds to 30 seconds (e.g., 0.5, 1, 5, 10, 20, or 30 seconds, inclusive of all ranges and values therebetween), such as 2 seconds. The second partial pressure of the co-reactant pulse can be in the range of 0.01 Torr to 10 Torr (e.g., 0.01, 0.05, 0.1, 0.5, 1.0, 5.0, or 10 Torr, inclusive of all ranges and values therebetween).

In some embodiments, exposing the electrode to the co-reactant for a co-reactant exposure time and a second partial pressure of the co-reactant so that the co-reactant reacts with the moiety formed by the first ALD metal precursor reacting with the base material. The co-reactant exposure time can be in the range of 0.5 seconds to 500 seconds (e.g., 0.5, 1, 5, 10, 20, 30, 40, 50, 60, 70, 80, 90, 100, 120, 140, 160, 180, 200, 220, 240, 260, 280, 300, 350, 400, 450 or 500 seconds, inclusive of all ranges and values therebetween), such as about 60 seconds. The second partial pressure of the co-reactant can be in the range of 0.01 Torr to 10 Torr (e.g., 0.01, 0.05, 0.1, 0.5, 1.0, 5.0, or 10 Torr, inclusive of all ranges and values therebetween). In some embodiments, the second partial pressure of the co-reactant is in the range of 0.1 Torr and 1 Torr (e.g., about 0.5 Torr).

The co-reactant purge evacuates unreacted co-reactant from the reactor. The co-reactant purge may be for a co-reactant purge time of 0.5 seconds to 500 seconds (0.5, 1, 5, 10, 20, 30, 40, 50, 60, 70, 80, 90, 100, 120, 140, 160, 180, 200, 220, 240, 260, 280, 300, 350, 400, 450 or 500 seconds, inclusive of all ranges and values therebetween), such as 120 seconds. The co-reactant purge reduces the pressure in the reactor to within the range of 0.01 Torr to 10 Torr (e.g., 0.01, 0.05, 0.1, 0.5, 1.0, 5.0, or 10 Torr, inclusive of all ranges and values therebetween), such as substantially to vacuum. In some embodiments, the second co-reactant purge may also consist of flowing an inert gas such as $N_2$ or Ar through the ALD reactor to sweep away unreacted co-reactant and reaction byproducts. In this case, the pressure in the ALD reactor may remain essentially constant during the second co-reactant purge.

In some embodiments, the second co-reactant may include one or more of water, hydrogen peroxide, and ozone. Varying the co-reactant may also vary the stoichiometry of the resultant modified electrode. Further co-reactants may include nitrous oxide, hydrogen, formaldehyde, trimethyl aluminum, ammonia, hydrazine, dimethyl hydrazine, diethyl hydrazine, methyl-ethyl hydrazine, hydrogen sulfide, trimethyl phosphite, trimethyl phosphate, silane, disilane, or any combination thereof. For example, the first ALD metal precursor can be trimethyl aluminum and the second co-reactant can be water.

Any number of cycles of exposing the base material to the first ALD metal precursor and the second co-reactant can be performed to reach a desired coating thickness on the base material. In some embodiments, the number of cycles of the ALD process can be in the range of 1-100 (e.g., 1 cycle, 2, 3, 4, 5, 10, 15, 20, 25, 30, 35, 40, 45, 50, 60, 70, 80, 90 or 100 cycles, inclusive of all ranges and values therebetween). For embodiments providing a coating on the cathode, the thickness of the ALD coating may be between 0.1 nm and 5 nm. In some embodiments, the ALD is performed using only the first ALD metal precursor without the need for the second co-reactant. In these cases, the first ALD metal precursor reacts with the substrate to form a coating. For instance, TMA can react with the $H_2O$ in $LiOH \cdot H_2O$ to form $Al_2O_3$ directly without the need for an exposure to $H_2O$ as the second co-reactant.

In one embodiment, following ALD, the material undergoes lithiation/calcination during which the material is also doped. In one embodiment, 'dopants' refers to a concentration at 5% or less. One of skill in the art will appreciate that to accomplish a dopant in the bulk, the cathode composition and the precursor for the dopant material should be selected to match oxidation state. Further, it should be appreciated that typical calcination limitations may apply, such as the parameters of the calcination limiting the amount of dopant that can penetrate the bulk.

Subsequent lithiation of ALD-treated cathode-carbonates/hydroxides is typically done by calcination in the presence of a lithium source (e.g. lithium hydroxide) at a temperature between 400° C. and 1000° C. Alternatively, ALD modified cathode-carbonates/hydroxides may be calcined in any controlled atmosphere, oxidizing or reducing (e.g., $O_2$, dry air, $N_2O$, $NH_3$, inert $N_2$, Ar), in the absence of lithium, prior to the lithiation step.

The calcination may be also selected to provide a desired stabilization to the cathode. For example, stabilization of the bulk cathode by the deposited ALD material may be achieved at a temperature of 450° C.-1200° C. while surface stabilization by a dopant ALD deposition may be achieved at a lower temperature, for example, between 100° C. and 600° C. In one example, the cathode material is calcined at a temperature equal to or below 700° C. under pure $O_2$ gas atmosphere.

Surface impurities formed on cathode materials of lithium ion batteries lead to a delithiation voltage peak and reduce the cycling stability of the electrodes. Common sources of surface impurities include residual impurities stemming from unreacted precursors during synthesis and impurities formed during ambient storage. By coating a precursor, the precursor inhibits formation of $Li_2CO_3$ in open air, thereby improving the shelf-life. Furthermore, producing a cathode material would typically involve calcination to remove the undesirable surface impurities. When calcining a pristine LiOH that has not been coated, a processing temperature of above 700° C. under pure $O_2$ gas atmosphere to remove surface impurities. However, by coating and inhibiting formation of the surface impurities, the processing temperature according to the present invention can be below 700° C. under pure $O_2$ gas atmosphere.

As an example, ~10 g $LiOH \cdot H_2O$ powder was loaded into a sample tray covered with a mesh to allow facile precursor diffusion and to keep the powders in the tray and installed into a Beneq TFS500 ALD reactor. ALD of $Al_2O_3$ was performed, maintaining the ALD reactor temperature at 150° C. using alternating exposures to TMA and $H_2O$ vapors. The ALD reactor temperature was set >100° C. to avoid condensation of $H_2O$ and <400° C. to avoid thermal decomposition of the TMA. The TMA exposure time was 10 s and the period of inert gas purging following the TMA exposure was 130 s. The $H_2O$ exposure time was 10 s and the $H_2O$ purge time was 130 s. Five ALD $Al_2O_3$ cycles were performed. The TMA and $H_2O$ were maintained at room temperature. The TMA partial pressure was 0.1 Torr during the TMA exposures, and the $H_2O$ partial pressure was 0.2 Torr during the $H_2O$ exposures. The steady-state pressure in the ALD reactor was 0.9 Torr maintained by a flow of ultrahigh purity $N_2$ (nitrogen gas concentration of 99.999%) of 300 sccm. The TMA and $H_2O$ exposure conditions were selected to ensure saturation of the ~10 g $LiOH \cdot H_2O$ powder. The mixture of Ni-hydroxide with ALD-treated $LiOH \cdot H_2O$ is prepared for $LiNiO_2$:Al-4% calcination. $LiNiO_2$:Al-4% is prepared through the calcination of the prepared mixture containing the ALD-treated $LiOH \cdot H_2O$ and Ni-hydroxide at a temperature (higher than or equal to 650° C., but lower than or equal to 700° C. under pure O2 gas atmosphere. One of skill in the art would understand that the temperature range described herein may be varied depending on various factors including the cathode composition, the nature of the precursor coating, and the intended application. For example, treating the Li-hydroxide inhibits carbonate formation and allows processing at a temperature lower than or equal to 700° C., which is desirable for producing high nickel cathodes. However, higher temperatures may be used for other compositions, such as those containing Mn. Furthermore, different temperatures may be chosen depending on the desired doping. For example, lower temperature (e.g. <650° C.) may be used for surface doping whereas higher temperature may be used to achieve bulk dopants.

As described previously, the surface coating formed by ALD enhances the shelf-life of lithium hydroxide by inhibiting the formation of $Li_2CO_3$. This is considered to be advantageous for extended storage under controlled atmosphere and even in open-air. Transition to $Li_2CO_3$ is disadvantageous because the higher melting temperature hinders the lithiation process. The invention described herein, by forming a surface coating, inhibits the transition to $Li_2CO_3$.

Figure 2:
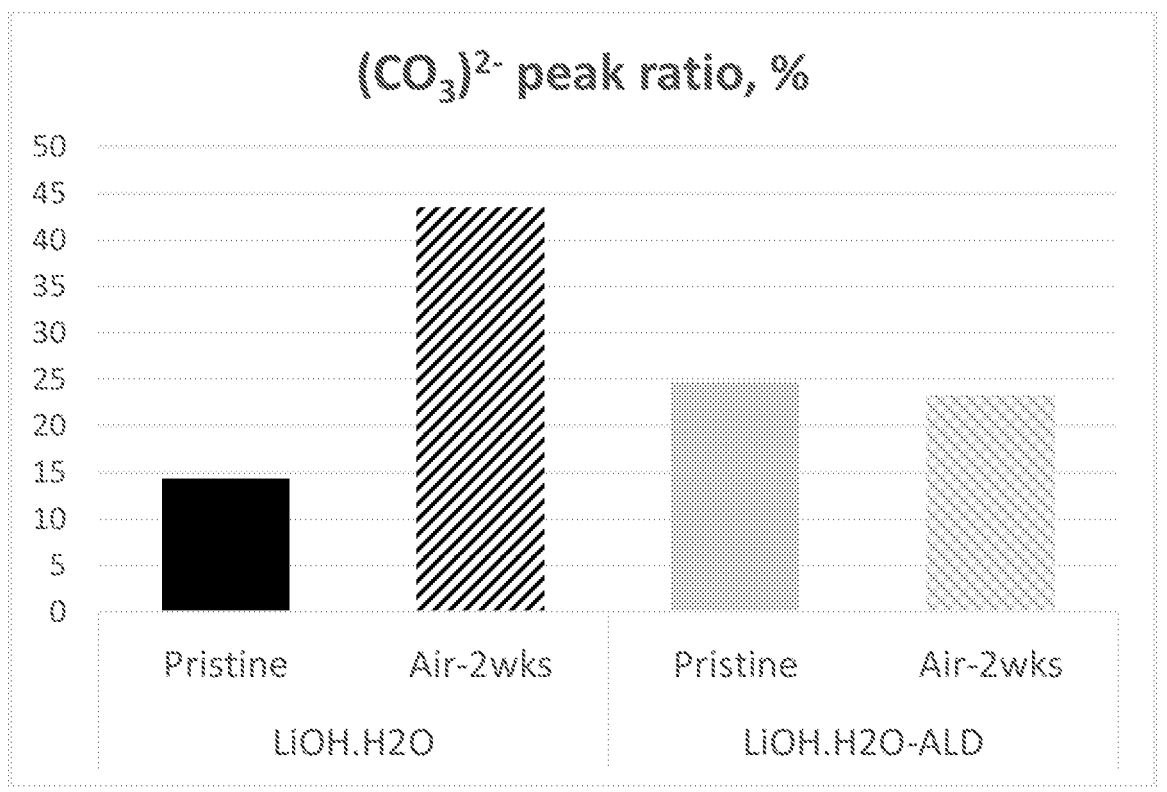
FIG. 2 illustrates the change of $(CO_3)^{2-}$ peak ratio from total C-1s spectra for $LIOH \cdot H_2O$ and ALD-treated $LiOH \cdot H_2O$ before and after open-air storage for 2 weeks.

FIGS. 1A-1D show C-1s X-ray photoelectron spectroscopy showing $LiOH \cdot H_2O$ (FIGS. 1A-1B) and ALD-treated $LiOH \cdot H_2O$ (FIGS. 1C-1D) before and after open-air storage for 2 weeks, and FIG. 2 shows the change of $(CO_3)^{2-}$ peak ratio from total C-1s spectra for $LiOH \cdot H_2O$ and ALD-treated $LiOH \cdot H_2O$ before and after open-air storage for 2 weeks. As can be seen in FIGS. 1A-1D and FIG. 2, treating $LiOH \cdot H_2O$ by ALD inhibits transition to $Li_2CO_3$ in open air environment. Specifically, $Li_2CO_3$ transition of the ALD-treated $LiOH \cdot H_2O$ according to the present disclosure is negligible while untreated $LiOH \cdot H_2O$ reacts with $CO_2(g)$ to form $Li_2CO_3$, which is approximately 2 times of the ALD-treated $LiOH \cdot H_2O$. Hence, the shelf-life of $LiOH \cdot H_2O$ is significantly improved via conformal ALD coating.

Figure 3A:
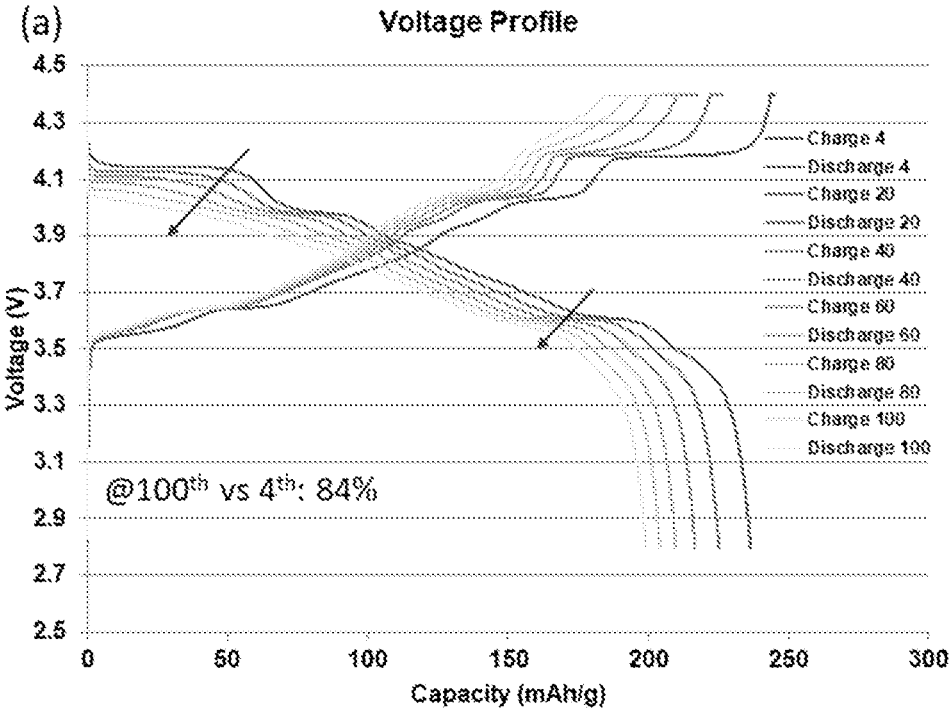
FIGS. 3A-3B show voltage profiles of pristine $LiNiO_2$ (FIG. 3A) and of Al-doped $LiNiO_2$ using ALD-treated $LiOH \cdot H_2O$ (FIG. 3B); 4.4-2.8V (vs Li), 3-formation cycle @C/10 (1C=200 mA/g), Cycling C/10-charge, C/3 discharge.
Figure 3B:
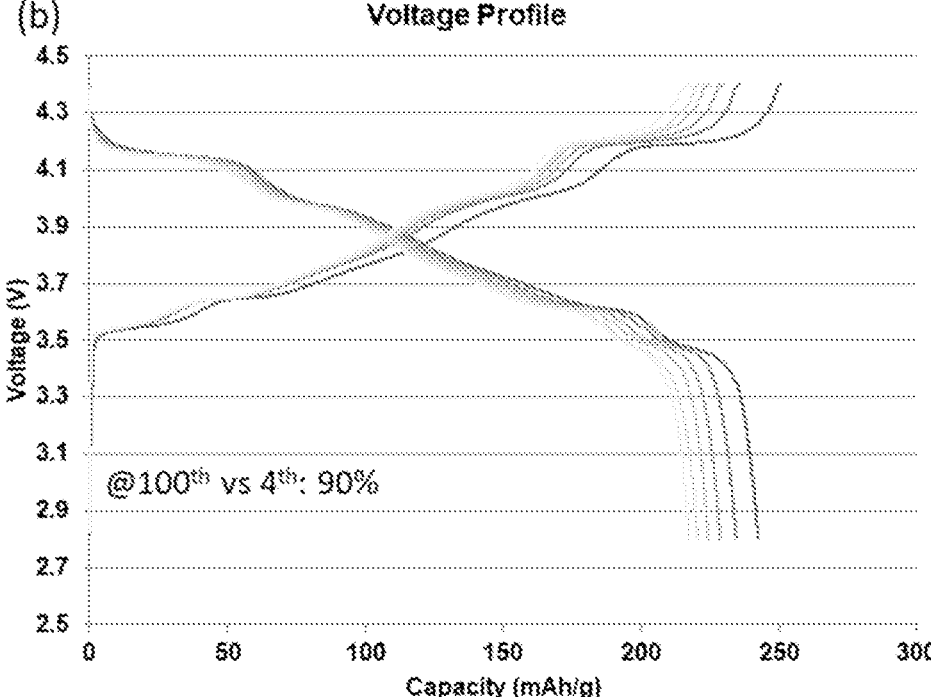

Following the calcination, voltage profiles for three formation cycles and mean charge/discharge voltages were measured. FIGS. 3A-3B show voltage profiles of pristine $LiNiO_2$ (FIG. 3A) and of Al-doped $LiNiO_2$ using ALD-treated $LiOH \cdot H_2O$ (FIG. 3B); 4.4-2.8V (vs Li), 3-formation cycle @C/10 (1C=200 mA/g), Cycling C/10-charge, C/3 discharge. Voltage profile of prolonged cycle for Al-doped $LiNiO_2$ shows reduced impedance due to Al-doping effect. Here, bulk Al-doping is completely achieved. Further, improved cycle stability is achieved compared to pristine $LiNiO_2$.

Figure 4A:
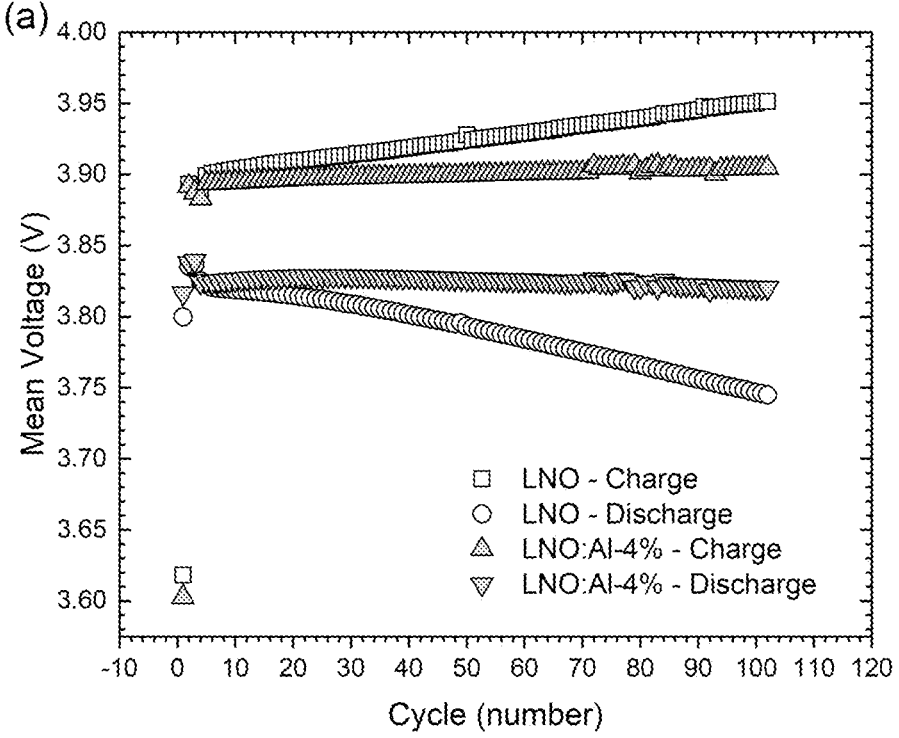
FIGS. 4A-4B show mean charge/discharge voltages at formation cycles (FIG. 4A) and 1-100 cycles (FIG. 4A) for pristine $LiNiO_2$ and Al-doped $LiNiO_2$ using ALD-treated $LiOH \cdot H_2O$; 4.4-2.8V, 3 formation cycle @C/10 (1C=200 mA/g), cycling @C/10-charge, C/3-discharge.
Figure 4B:
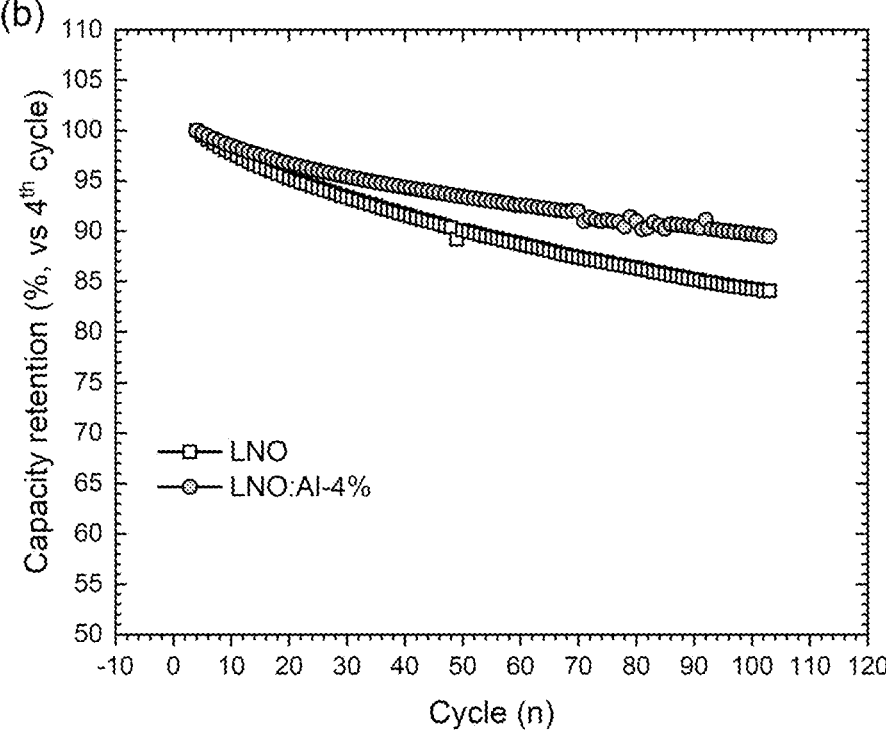

FIGS. 4A-4B show mean charge/discharge voltages at formation cycles (FIG. 4A) and 1-100 cycles (FIG. 4B) for pristine $LiNiO_2$ and Al-doped $LiNiO_2$ using ALD-treated $LiOH \cdot H2O$; 4.4-2.8V, 3 formation cycle @C/10 (1C=200 mA/g), cycling @C/10-charge, C/3-discharge. As can be seen in FIGS. 4A-4B, prolonged cycles show that mean voltage, both charge and discharge, for Al-doped LiNiO$_2$ is stable during cycle, which correspondences to reduced impedance. In addition, the retention at 100 cycles is significantly improved for LiNiO$_2$:Al-4% by adopting the ALD-treated LiOH·H$_2$O.

Following the calcination, the material was analyzed using Inductively Coupled Plasma Optical Emission spectroscopy (ICP-OES) to determine the elemental content. The result of ICP-OES analysis for LiNiO$_2$:Al-4% is shown in the Table 1 below.

TABLE 1

| ICP-OES analysis for LiNiO$_2$:Al-4% using ALD-treated LiOH•H$_2$O | | | |
|---|---|---|---|
| Element | Li | Ni | Al |
| Molar ratio (assumed total metal as 1) | 1.015 | 0.964 | 0.036 |

It is well-known in the art that varying the calcination time, temperature, and atmosphere plays an important role and is, in general, an optimization process dependent on the composition of the material and the desired outcome. For example, if a final cathode product is treated with an ALD precursor element (e.g., Al), that precursor element might be substituted into the surface by low temp/short-time calcination. However, the same precursor element could be driven into the bulk of the material by higher-temp/longer time calcination. The parameters that control doping may further include crystallographic structure, thermodynamic stability of the ALD material, thermodynamic stability of the core materials, and the nature of ALD material precursor. For example, TMA-H$_2$O can give Al$_2$O$_3$ and upon calcination can doped all surface Al into the core, but TMA-HF pyridine may result in AlF$_3$ that may dope partially dope Al into core. In another example 10 cycles of TMA-H$_2$O at 200° C. can give 1.0 nm (250 ppm) of Al$_2$O$_3$ and upon calcination which can dope all surface Al into the core, whereas 10 cycles of AlCl$_3$ and Al(Oi Pr)$_3$ at 200° C. can give 1.4 nm of Al$_2$O$_3$ and upon calcination the Al dopant % can be different. In one example, the Al dopant in the cathode material may be 4%, forming a cathode material of LiNiO$_2$:Al-4%.

A material comprising lithiated metal oxide having a general formula of LiMO$_y$ can be provided. The metal represented by "M" in the lithiated metal oxide can be chosen from at least one of Co, Ni, Mn, Fe, Al, and Ti. Non-limiting examples of the lithiated metal can be chosen from at least one of lithium cobalt oxide (LiCo$_x$O$_y$), lithium nickel oxide (LiNi$_x$O$_y$), lithium manganese oxide (LiMn$_x$O$_y$), lithium nickel cobalt manganese oxide, (LiNi$_x$-Co$_y$Mn$_z$Oz$_z$), lithium nickel cobalt manganese iron oxide (LiNi$_x$Co$_y$Mn$_z$Fey$_y$Oz$_z$), lithium iron phosphate (LiFe$_x$PO$_y$), lithium nickel cobalt aluminum oxide (LiNi$_x$Co$_y$Al$_z$Oz$_z$), and lithium titanate (LiTi$_x$O$_y$). In one embodiment, the lithiated metal may be LiNiO$_2$.

The materials of this invention may be extended to other substitutional elements of interest (e.g., K, B, Na, Mg, Fe, Ti, Hf, Zr, Ga, Ta, Mn, Co, F, etc.) and is envisioned to include any element in precursor form suitable for ALD deposition techniques, including fluorides, oxides, nitrides, as well as combinations and lithiated derivatives thereof. Careful control over the ALD deposition and subsequent treatment parameters, such as precursor types (e.g., ALD, cathode-carbonate, and cathode-hydroxide), time, temperature, and atmosphere can influence material performance, phases formed, and the degree of bulk vs. surface concentration of dopants. As such, surface modifications also fall under this method. One of skill in the art would understand that the method described herein will be applicable across various materials applications such as fuel cells, solid-state electrolytes, and others where precursor chemistries play a role before reaching a final product.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

We claim:

1. A method of producing a nickel cathode material, the method comprising:
   providing a lithium precursor;
   selectively depositing an oxide, fluoride, nitride, or a combination thereof on the lithium precursor by atomic layer deposition (ALD), forming an ALD-treated lithium precursor;
   preparing a mixture of nickel metal hydroxide with the ALD-treated lithium precursor;
   calcining the prepared mixture.

2. The method of claim 1, wherein the calcining the prepared mixture is completed at a temperature equal to or below 700° C. under pure O$_2$ gas atmosphere.

3. The method of claim 1, wherein the lithium precursor is LiOH or LiOH·H$_2$O.

4. The method of claim 1, wherein the oxide is selected from the group consisting of Al$_2$O$_3$, MgO, SiO$_2$, TiO$_2$, ZnO, SnO$_2$, ZrO$_2$, Nb$_2$O$_5$, and B$_2$O$_3$.

5. The method of claim 1, wherein selectively depositing the oxide, fluoride, nitride, or a combination thereof comprises exposing the lithium precursor to a single ALD precursor such as TMA, AlCl$_3$, TMB, TiCl$_4$, H$_2$S, WF$_6$, MoF$_6$, TMG, TMIn, BF$_3$, B$_2$F$_4$, or DEZ.

6. The method of claim 1, wherein temperature of the lithium precursor is maintained at a temperature between 100° C. and 400° C. during atomic layer deposition.

7. The method of claim 1, wherein a number of atomic layer deposition coating cycles is one or more and less than or equal to ten.

8. The method of claim 1, wherein a number of atomic layer deposition coating cycles is one or more and less than or equal to six.

9. The method of claim 1, wherein after calcining the prepared mixture, the nickel cathode material is doped with an element, wherein the element is also present in the oxide.

10. The method of claim 9, wherein the element is aluminum and after calcining the prepared mixture, $LiNiO_2$:Al-4% is formed.

11. The method of claim 9, wherein the element is selected from a group consisting of: Al, K, B, Na, Mg, Fe, Ti, Hf, Zr, Ga, Ta, Mn, Co, and F.

\* \* \* \* \*